(12) United States Patent
Nakajima et al.

(10) Patent No.: US 6,882,447 B1
(45) Date of Patent: Apr. 19, 2005

(54) IMAGE CONVERTING APPARATUS, STORAGE MEDIUM, AND IMAGE CONVERTING METHOD

(75) Inventors: Hisanori Nakajima, Nagano (JP); Satoshi Shirai, Nagano (JP); Masahiro Hirose, Nagano (JP); Kazuyoshi Sato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 886 days.

(21) Appl. No.: 09/686,078

(22) Filed: Oct. 12, 2000

(30) Foreign Application Priority Data

Oct. 13, 1999 (JP) .......................................... 11-291493

(51) Int. Cl.[7] .............................. B41B 1/00; G03F 3/08; G06K 15/00
(52) U.S. Cl. ........................ 358/1.9; 358/523; 358/2.1
(58) Field of Search .................... 358/1.9, 523, 2.1, 358/3.23, 1.13, 1.16, 518, 520, 538, 540, 452, 450, 462, 453; 382/164, 165

(56) References Cited

U.S. PATENT DOCUMENTS

| | | | | |
|---|---|---|---|---|
| 4,922,349 A | * | 5/1990 | Abe et al. .................... | 358/443 |
| 5,483,360 A | * | 1/1996 | Rolleston et al. ........... | 358/518 |
| 5,543,935 A | * | 8/1996 | Harrington .................. | 358/3.07 |
| 5,734,802 A | * | 3/1998 | Maltz et al. ................. | 358/1.9 |
| 6,157,737 A | * | 12/2000 | Ishikawa et al. ............ | 382/195 |
| 6,160,634 A | * | 12/2000 | Terashita .................... | 358/1.9 |
| 6,219,454 B1 | * | 4/2001 | Kawano et al. ............. | 382/232 |
| 6,222,613 B1 | * | 4/2001 | Haraguchi et al. ........... | 355/40 |
| 6,449,060 B1 | * | 9/2002 | Kawai et al. ................. | 358/1.9 |
| 6,459,495 B1 | * | 10/2002 | Silverbrook ................. | 358/520 |
| 6,476,924 B1 | * | 11/2002 | Toda et al. .................. | 358/1.13 |
| 6,532,081 B1 | * | 3/2003 | Cecchi et al. ................ | 358/1.9 |
| 6,633,409 B1 | * | 10/2003 | Yamazaki .................... | 358/1.9 |
| 6,650,437 B1 | * | 11/2003 | Nakajima .................... | 358/1.9 |
| 6,690,489 B1 | * | 2/2004 | Jacob et al. ................. | 358/1.9 |

FOREIGN PATENT DOCUMENTS

| | | | |
|---|---|---|---|
| EP | 0 371 389 A2 | 6/1990 | |
| EP | 0 822 704 A2 | 2/1998 | |
| EP | 0 940 975 A2 | 9/1999 | |
| JP | 02-084879 | 3/1990 | |
| JP | 07-099588 | 4/1995 | |
| JP | 9-193477 | 7/1997 | ............ B41J/2/525 |
| JP | 10-042142 | 2/1998 | |
| JP | 11-069150 | 3/1999 | |
| JP | 2000196859 A | * 7/2000 | .......... H04N/1/387 |

* cited by examiner

Primary Examiner—Madeleine Nguyen
(74) Attorney, Agent, or Firm—Sughrue Mion, PLLC

(57) ABSTRACT

According to the present invention, document data containing both draw data and image data can properly and efficiently be converted into image data. There is provided a CMYK conversion unit 113 comprising an area unit converting section 1134 and a pixel unit converting section 1135. The area unit converting section switches color conversion tables between LUT 134 and LUT 135 at every area, depending upon sort of draw object contained in the area, for an area except area containing both draw data and image data of RGB image data, thereby converting RGB image data into CMYK image data. The pixel unit converting section switches color conversion tables between LUT 134 and LUT 135 at every pixel, depending upon sort of draw object indicated by the pixel, for an area containing both draw data and image data of RGB image data, thereby converting RGB image data into CMYK image data.

13 Claims, 4 Drawing Sheets

FIG.3

CMYK IMAGE DATA

CELL UNIT MANAGEMENT TABLE 122

|   |   |   |   |   |   |
|---|---|---|---|---|---|
| A |   |   |   | A | A |
|   | A |   | A | A |   |
| A |   | B |   | A | A |
|   | B | B | B | A,B |   |
|   | B | B | B |   |   |

WHEN FLAG OF CORRESPONDING CELL IS DRAW (A), REFER TO LUT 134, AND WHEN FLAG OF CORRESPONDING CELL IS DRAW (B), REFER TO LUT 135

DRAW DATA LUT — 134

IMAGE DATA LUT — 135

WHEN VALUE OF CORRESPONDING MANAGEMENT PIXEL IS DRAW, REFER TO LUT 134, AND WHEN VALUE OF CORRESPONDING MANAGEMENT PIXEL IS IMAGE, REFER TO LUT 135

ROWS OTHER THAN FIFTH/SIXTH ROWS ARE CONVERTED BY AREA UNIT CONVERTING SECTION 1134

PIXEL UNIT MANAGEMENT TABLE (FIFTH ROW)

PIXEL UNIT MANAGEMENT TABLE (SIXTH-ROW)

FIFTH/SIXTH ROWS ARE CONVERTED BY PIXEL UNIT CONVERTING SECTION 1135

RGB IMAGE DATA

IMAGE CONVERTING APPARATUS, STORAGE MEDIUM, AND IMAGE CONVERTING METHOD

This application claims a priority based on Japanese Patent Application No. 11-291493 filed on Oct. 13, 1999, the entire contents of which are incorporated herein by reference for all purposes.

BACKGROUND OF THE INVENTION

The present invention is directed to a technique capable of converting document data into image data constituted by a plurality of pixel data, in particular, CMYK image data corresponding to a format suitable for printing operation. The document data is constituted by containing a draw command used to designate a draw object of draw data such as a text and a figure, and of image data such as a photograph.

Conventionally, while using a printer driver constituted on a computer, a data conversion operation from document data into CMYK image data suitably formatted to a printing operation is carried out as follow. This document data is constituted by containing a draw command used to designate a draw object.

In this data converting operation, draw commands contained in document data sent from an application program are stored into a spooler formed on a memory in accordance with a drawing order. Next, the draw commands stored in the spooler are read out in the drawing order, and then draw objects specified by these read draw commands are image-expanded so as to obtain RGB image data. Thereafter, the RGB image data thus obtained is subjected to color-correction with reference to a color conversion table for storing thereinto color correction information and the like, so as to be converted into desirable CMYK image data.

On the other hand, normally, there is a difference between a color correction required when a draw object corresponds to draw data and another color correction required when this draw object corresponds to image data. Concretely speaking, in the case that a draw object designated by a draw command contained in document data corresponds to such draw data as a text and a figure, one color correction should be applied when RGB image data obtained from this document data is converted into CMYK image data. In the case that the above-described draw object corresponds to such image data as a photograph, another color correction should be applied when RGB image data obtained from this document data is converted into CMYK image data. In these color corrections, for instance, this image data is required to be color-matched with a monitor, whereas a saturation of the draw data constitutes a major important factor.

As a consequence, in a conventional image conversion system, two different sorts of color conversion tables are prepared for draw data and image data. Prior to a printing operation, a user is requested to select a sort of document data to be printed out (namely, user selects printing operation of draw data or image data). Then, RGB image data is converted into CMYK image data by employing a color conversion table in accordance with the selected data.

SUMMARY OF THE INVENTION

Very recently, various application programs have been widely popularized by which document data containing both draw commands for designating draw objects of draw data and draw commands for designating draw objects of image data can be formed.

The above-explained conventional printer driver owns such a problem that the document data formed by such an application program cannot be converted into CMYK image data in a proper manner. This document data contains both the draw command for designating the draw data, and also the draw command for designating the image data.

For example, in such a case that the user selects the draw data as the sort of this document data, such an image data portion of the RGB image data, which is image-expanded by the draw command for designating the image data would also be converted into the CMYK image data with reference to the color conversion table for the draw data. As a result, there is a problem that this image data portion could not be converted into the desirable CMYK image data in the proper manner.

The present invention has been made to solve the above-described problem, and therefore, has an object to provide such an image converting method/apparatus capable of converting document data which is constituted by containing plural sorts of draw objects into image data made of a plurality of pixel data in a proper manner and in a high efficiency. For example, such document data constituted by containing the draw command can be converted into the image data made of the plural pixel data, in particular, the CMYK image data corresponding to the format suitable for the printing operation in the proper manner and also in the higher efficiency. This draw command designates the draw object of the draw data (e.g., text and figure) or the image data (e.g., photograph).

To achieve the above-described object, there is provided an image converting apparatus, according to a first aspect of the present invention, for converting document data constituted by containing plural sorts of draw objects (for instance, draw object classified as draw data such as text and figure, and also draw object classified as image data such as photograph) into image data constituted by a plurality of pixel data, comprising:

first conversion means for converting the document data into first image data (e.g., RGB image data);

second conversion means for converting the first image data into second image data (e.g., CMYK image data); and a plurality of tables provided in correspondence with at least of plural sorts of draw objects and containing information (e.g., color correction information) to which the image converting apparatus refers when the first image data acquired by converting the sort of draw object corresponding thereto is converted into the second image data; wherein:

the second conversion means includes:

area unit conversion means, as to each of areas obtained by subdividing the first image data by plural number, for converting first image data of the area into second image data, while referring to the table corresponding to a sort of draw object contained in the area;

pixel unit conversion means, as to each of pixel data constituting the first image data, for converting the pixel data into second image data, while referring to the table corresponding to a sort of draw object indicated by the pixel data; and conversion switching means for applying the pixel unit conversion means to such an area which contains at least two sorts of draw objects corresponding to the tables different from each other, and also for applying the area unit conversion means to such an area which contains at least one sort of draw object corresponding to the same table, within the first image data.

In this image converting apparatus, as to each of the areas obtained by subdividing the first image data by the plural number, in such a case that a draw object is not contained in the area, the area unit conversion means may convert first image data of the area into second predetermined image data without reference to the tables; and as to each of the pixel data constituting the first image data, in such a case that the pixel data does not indicate a draw object, the pixel unit conversion means may convert the pixel data into predetermined second image data without referring to the tables.

Also, the above-described area unit conversion means and the pixel unit conversion means may be switched by the conversion switching means in accordance with the below-mentioned manner:

That is, the image converting apparatus is further comprising first judging means operated, prior to the conversion of document data into first image data by the first conversion means, in such a manner that when the document data is converted into the first image data, as to each of first areas obtained by subdividing the first image data by plural number, the first judging means judges a draw object contained in the area;

second judging means for judging as to whether or not plural sorts of draw objects (e.g., both draw object classified as draw data such as text and figure, and draw object classified as image data such as photograph) are contained, which corresponds to the tables different from each other, in each of plural second areas constituted by containing at least one first area, based upon the judgment result of the first judging means; and third judging means operated in such a manner that while the document data is converted into the first image data by the first converting means, as to each of the pixel data contained in the second area which is judged by the second judging means in such a way that the plural sorts of draw objects corresponding to the tables different from each other are contained therein, the third judging means judges the draw object indicated by the pixel data.

The conversion switching means applies the area unit conversion means to such a second area which is not judged by the second judging means in such a way that the plural sorts of draw objects corresponding to the tables different from each other are contained. Further, the conversion switching means applies the pixel unit conversion means to such a second area which is so judged by the second judging means in such a way that the plural sorts of draw objects corresponding to the tables different from each other are contained.

In this case, the area unit conversion means may determine a table which should be referred to in the case that as to the second area application-instructed by the conversion switching means, first image data contained in this second area is converted based upon the judgment result of the first judging means.

Similarly, the pixel unit conversion means may determine the tables which should be referred to in the case that as to each of the pixel data contained in the second area application-instructed by the conversion switching means, the pixel data is converted based upon the judgment result of the third judging means.

In accordance with the present invention, with respect to the area which contains the plural sorts of draw objects (e.g. both draw object classified as draw data such as text and figure, and also draw object classified as image data such as photograph) corresponding to the tables different from each other among the first image data, as to each pixel data contained in the are, the table which should be referred to is determined in accordance with the sort of the draw object indicated by the pixel data concerned. While using the determined tables, the first image data is converted into the second image data. On the other hand, as to the area which does not contain the plural sorts of draw objects corresponding to the tables different from each other among the first image data, the table which should be referred to is determined in accordance with the sorts of the draw objects contained in the area. While using the determined tables, the first image data is converted into the second image data. As a consequence, the document data containing the plural sorts of draw objects can be properly converted into the second image data in the high efficiency.

BRIEF DESCRIPTION OF THE DRAWINGS

For a better understanding of the present invention, reference is made of a detailed description to be read in conjunction with the accompanying drawings, in which:

FIG. 3 is an illustration for explaining a basic idea of processing operations executed in an area unit converting section 1134, a pixel unit converting section 1135, and a conversion switching section 1136 employed in the print control apparatus 1 shown in FIG. 1.

DETAILED DESCRIPTION OF THE PREFERRED EMBODIMENTS

Referring now to drawings, an embodiment of the present invention will be described in detail.

Figure 1:
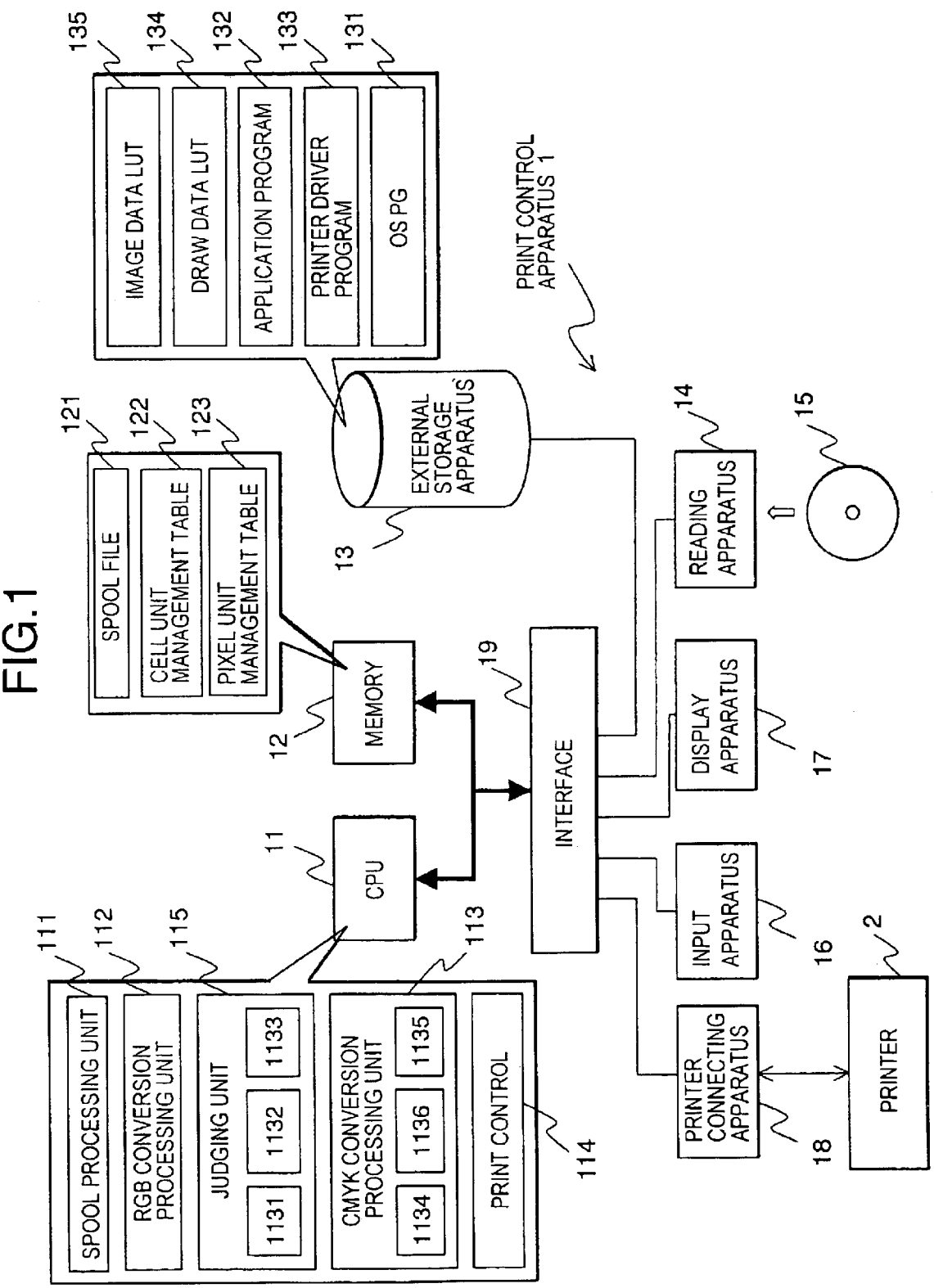
FIG. 1 is a schematic block diagram for representing an entire arrangement of a print control apparatus 1 to which an embodiment mode of the present invention is applied.

FIG. 1 schematically indicates an overall arrangement of a print control apparatus 1, to which a preferred embodiment of the present invention is applied.

As shown in FIG. 1, a print control apparatus 1 of this embodiment may be constructed on a general-purpose computer. This general-purpose computer is provided with a CPU (central processing unit) 11, a memory 12, an external storage apparatus 13 such as a hard disk drive, a data reading apparatus 14 for reading data from a storage medium 15 having portability such as a CD-ROM (compact disk-read-only memory) and an FD (floppy disk). The computer is further provided with an input apparatus 16 such as a keyboard and a mouse, a display apparatus 17 such as a display unit, a printer connecting apparatus 18 such as either a serial interface or a parallel interface connected to a printer 2, and also an interface 19 for inputting/outputting data among the above-explained structural elements.

In this computer system, the external storage apparatus 13 stores thereinto an OS (operating system) program 131, an application program 132, a printer driver program 133, a draw data color conversion table 134, and image data color conversion table 135. The OS program 131 is loaded onto the memory 12 when the computer is initiated so as to totally control operations of this computer, and is executed by the CPU 11. The application program 132 is used to form document data. This document data contains draw commands for designating a draw object of draw data such as a text and a figure (drawing), and also of image data such as a photograph. The printer driver program 133 is used to construct the print control apparatus 1 according to this embodiment on the computer.

In this case, the above-described printer driver program 133, draw data color conversion table 134, and image data color conversion table 135 may be read out from the portable storage medium 15 such as a CD-ROM and an FD by operating the reading apparatus 14, and then, these read program and tables 133, 134, 135 may be installed in the external storage apparatus 13. Furthermore, these printer driver program 133, and color conversion tables 134, 135 may be down-loaded from a communication apparatus (not shown) via a network (not shown either) to the external storage apparatus 13.

It should be understood that as the draw command used to designate the draw object in this computer system, the following commands may be utilized, for example, the command made of "Quick Draw Op-code" used in the operating system (OS) known as "Mac OS" (trade mark) and "Kanji Talk" (trade mark) marketed by Apple Computer, Inc.

The CPU 11 loads and executes the printer driver program 133 onto the memory 12 in response to an instruction issued from the application program 132 under execution. As a result, a SPOOL (Simultaneous Peripheral Operations OnLine) processing unit 111, an RGB conversion processing unit 112, a CMYK conversion processing unit 113, a print control unit 114, and a judging unit 115 are realized as a process.

The SPOOL processing unit 111 stores various draw commands contained in document data formed by the application program 132 into a SPOOL file 121 formed in either the memory 12 or the external storage apparatus 13 in the drawing order.

The RGB conversion processing unit 112 reads out the respective draw commands contained in the document data stored in the SPOOL file 121 in the drawing order, image-expands a draw object in accordance with the read draw command, whereby the document data is converted into the RGB image data. Thereafter, the RGB image data is stored into either the memory 12 or the external storage apparatus 13. It should also be noted that when the above-explained "Quick Draw Op-code" is used as the draw command, the RGB conversion processing unit 112 can be realized by using the "rasterize engine" prepared by the operating system known as "Mac OS" and "Kanji Talk" (trade marks).

The CMYK conversion processing unit 113 converts the RGB image data formed by the RGB conversion processing unit 112 into CMYK image data having such a format suitable for printing operation by the printer 2. Then, the CMYK conversion processing unit 113 stores the CMYK image data into either the memory 12 or the external storage apparatus 13. The CMYK conversion processing unit 113 contains an area unit converting section 1134, a pixel unit converting section 1135, and also a conversion switching section 1136. These converting and switching sections will be discussed later.

The print control unit 114 sends the CMYK image data produced by the CMYK conversion processing unit 113 via the printer connecting apparatus 18 to the printer 2 for printing out the image, while using a control command which can be interpreted by the printer 2.

The judging unit 115 includes a first judging section 1131 to a third judging section 1133. These judging sections 1131 to 1133 will be explained later.

In the case that a draw object designated by a draw command contained in document data corresponds to draw data such as a text and a figure (drawing), such color correction information is described in the draw data color conversion table 134. That is, when RGB image data produced from this document data is converted into relevant CMYK image data, this color correction information should be applied.

In the case that a draw object designated by a draw command contained in document data corresponds to image data such as a photograph, such color correction information is described in the image data color conversion table 135. That is, when RGB image data produced from this document data is converted into relevant CMYK image data, this color correction information should be applied.

As previously explained, the draw data color conversion table 134 and the image data color conversion table 135 are conventionally used when the RGB image data is converted into the CMYK image data.

Next, a description will now be made of the first judging unit 1131 to the third judging unit 1133 contained in the judging unit 115.

Figure 2:
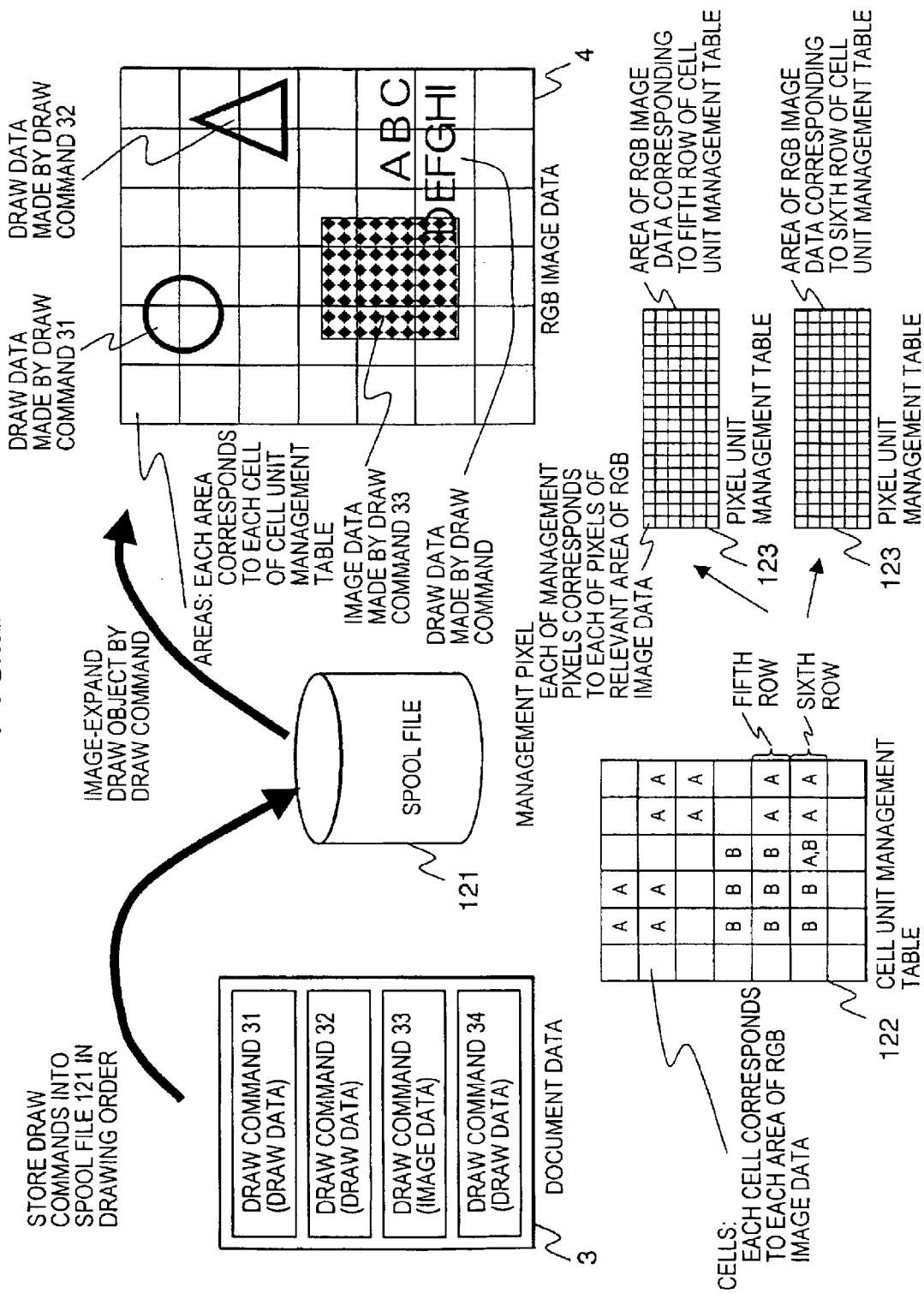
FIG. 2 is an illustration for explaining a basic idea of processing operations executed in a first judging unit 1131 to a third judging unit 1133 employed in the print control apparatus 1 shown in FIG. 1.

FIG. 2 is a diagram for illustratively showing a basic idea of process operations executed in the first judging unit 1131 to the third judging unit 1133.

While the SPOOL processing unit 111 stores the respective draw commands 31 to 34 contained in the document data 3 formed by the application program 132 into a SPOOL file 121, the first judging unit 1131 checks a sort of a draw object (namely, draw data or image data) designated by each of the draw commands, and a draw position of this draw object. Then, the first judging unit 1131 registers the check results into a cell unit management table 122 formed on either the memory 12 or the external storage apparatus 13.

As indicated in FIG. 2, the cell unit management table 122 is constituted by a plurality of cells. These plural cells correspond to the respective areas obtained by subdividing the RGB image data 4 into plural image areas in the case that the document data 3 is converted into the RGB image data 4. The respective cells of this cell unit management table 122 are empty under initial condition. It should be noted that the size of the RGB image data 4 obtained by converting the document data 3 may be acquired from the size information contained in the document data 3. First, the first judging unit 1131 produces such a cell unit management table 122, the respective cells of which are empty, based on this size information.

Next, every time the SPOOL file 121 stores thereinto one draw command, the first judging unit 1131 checks a sort of a draw object and a draw position of this draw object, which are designated by this draw command, and then sets a flag indicative of this sort of the checked draw object to the cell corresponding to this designated draw position. In an example, shown in FIG. 2, when the draw object is the draw data, the first judging unit 1131 sets a flag "A", whereas when the draw object is the image data, the first judging unit 1131 sets another flag "B." As a consequence, as represented in FIG. 2, two different flags "A" and "B" are set to such a cell corresponding to an area where both draw data and image data are drawn.

After the process operation by the first judging unit 1131 has been accomplished, the second judging unit 1132 checks the contents of the cell unit management table 122 so as to detect such a row where two different flags "A" and "B" are set. In the example of FIG. 2, one row is constructed of 6 cells. In the cell unit management table 122 shown in FIG. 2, two rows, namely a 5th row and a 6th row are detected by the second judging unit 1131.

In such a case that the RGB conversion processing unit 112 reads out the respective draw commands stored in the SPOOL file 121 in the draw order so as to image-expand a draw object and produce RGB image data 4, as to each of the pixel data located in the area corresponding to the row of the cell unit management table 122, which is detected by the second judging unit 1132, the third judging unit 1133 checks a sort of a draw object indicated by this pixel data and then registers the checked result to the pixel unit management table 123 formed on either the memory 12 or the external storage apparatus 13.

As represented in FIG. 2, each of the pixel unit management tables 123 is provided in correspondence with such an area corresponding to the row of the cell unit management table 122, which is detected by the second judging unit 1132, among the RGB image data 4 obtained by converting the document data 3. In the respective pixel unit management tables 123, the pixel management data corresponding to the respective pixel data contained in the above-explained area are stored. Under initial condition, each of these pixel management data constitutes a value for indicating that a draw object is not drawn. First, the third judging unit 1133 produces the pixel unit management table 123 in which the respective pixel management data constitute such values for indicating that no draw objects are drawn based upon the size information contained in the document data 3 and the row of the cell unit management table 122, which is detected by the second judging unit 1132.

Next, when the RGB conversion processing unit 112 commences the data conversion from the document data 3 into the RGB image data 4, the third judging unit 1133 monitors this conversion condition. Then, when the drawing operation of the draw object located in the area of the RGB image data 4 corresponding to the pixel unit management table 123 is commenced, the third judging unit 1133 changes the value of each of the pixel management data stored in the pixel unit management table 123, which corresponds to each of the pixel data of the RGB image data 4 in which the draw object concerned is drawn, into a value indicative of a sort of this draw object (namely, draw data, or image data) at the same time, while utilizing the draw command which designates this draw object. This process operation is repeatedly carried out with respect to all of the draw commands which designate the draw object located in the area of the RGB image data 4 corresponding to the pixel unit management table 123, so that the pixel unit management table 123 is accomplished. It should also be noted that as shown in the RGB image data 4 of FIG. 2, such pixel management data is changed into a value indicative of a sort of a finally drawn draw object. This pixel management data corresponds to a portion in which a plurality of draw objects are drawn, while being overlapped with each other (namely, a portion where image data by draw command 33 is overlapped with draw data by draw command 34).

It should also be understood that when the above-described "Quick $f_4$ Draw Op-code" is used as the draw command, the third judging unit 1133 may be realized by using the above-described "rasterize engine" prepared by the operating system known as "Mac OS (trade mark)" and "Kanji Talk (trade mark)." In this case, as the values of the respective pixel management data for constituting the pixel unit management table 123, for example, a data value indicative of "red" color may be allocated to such a value which indicates that the draw object is not drawn; a data value indicative of "green" color may be allocated to such a value which represents that the drawn draw object is the draw data; and also a data value indicative of "blue" color may be allocated to such a value which indicates that the drawn draw object is the image data.

Subsequently, a description will now be made of the area unit converting section 1134, the pixel unit converting section 1135, and the conversion switching section 1136, which are contained in the CMYK conversion processing unit 113.

FIG. 3 is an explanatory diagram for explaining basic process operations of the area unit converting section 1134, the pixel unit converting section 1135, and the conversion switching section 1136.

In the case that as to each of the areas of the RGB image data 4 shown in FIG. 2, a draw object contained in this area corresponds to draw data, the area unit converting section 1134 converts RGB image data contained in this area into CMYK image data with reference to the draw data color conversion table 134. When this draw object corresponds to image data, the area unit converting section 1134 converts RGB image data contained in this area into CMYK image data with reference to the image data color conversion table 135. Then, in such a case that no draw object is contained in this area, the area unit converting section 1134 converts RGB image data contained in this area into predetermined CMYK image data (for instance, RGB image data is converted into such CMYK image data having data value "0" indicative of no drawing).

It should also be noted that the judgement of the draw object contained in each of the areas can be carried out with reference to the cell unit management table 122 produced by the above-explained first judging section. In other words, as indicated in FIG. 3, when a certain area of the RGB image data 4 is converted into CMYK image data, a check is made of a flag of a cell corresponding to this area of the cell unit management table 122. In the case that this checked flag represents draw data (A), the area unit converting section 1134 converts RGB image data of this area into CMYK image data by using the draw data color conversion table 134. In the case that this checked flag represents image data (B), the area unit converting section 1134 converts RGB image data of this area into CMYK image data by using the image data color conversion table 135. In the case no flag is set, the area unit converting section 1134 converts RGB image data of this area into predetermined CMYK image data.

With respect to each of the pixel data which constitute the RGB image data 4 shown in FIG. 2, when the relevant pixel data represents draw data, the pixel unit converting unit 1135 converts this pixel data into CMYK image data with reference to the draw data color conversion table 134. In the case that the relevant pixel data represents image data, the pixel unit converting section 1135 converts this pixel data into CMYK image data with reference to the image data color conversion table 135. Then, in such a case that this relevant pixel data does not indicate a draw object, the pixel unit converting section 1135 converts this pixel data into predetermined CMYK image data. For instance, this pixel data is converted into CMYK image data of such a data value "0" indicative of no drawing.

It should also be noted that the judgement of the draw object indicated by each of the pixel data can be carried out with reference to the pixel unit management table 123 produced by the above-explained third judging section. In other words, as indicated in FIG. 3, when certain pixel data of the RGB image data 4 is converted into CMYK image data, a check is made of pixel management data corresponding to this pixel data of the pixel unit management table 123. In the case that this checked pixel management data represents draw data, the pixel unit converting section 1135 converts the pixel data into CMYK image data by using the draw data color conversion table 134. In the case that this pixel management data represents image data, the pixel unit converting section 1135 converts the pixel data into CMYK image data by using the image data color conversion table 135. In the case that this pixel management data indicates such a fact that the draw object is not drawn, the pixel unit converting section 1135 converts the above-described pixel data into predetermined CMYK image data.

The conversion switching section 1136 converts the RGB image data produced by the RGB conversion processing unit 112 into CMYK image data by using both the area unit converting section 1134 and the pixel unit converting section 1135. Concretely speaking, as to an area of the RGB image data 4 corresponding to the row of the cell unit management table 122, which is detected by the second judging section 1132, this conversion switching section 1136 applies the pixel unit converting section 1135 for converting the RGB image data into the CMYK image data. As to an area of the RGB image data 4 corresponding to the row of the cell unit management table 122, other than such a row detected by the second judging unit 1132, this conversion switching section 1136 applies the area unit converting section 1134 for converting the RGB image data into the CMYK image data. It should also be understood that in the example of FIG. 3, as to areas corresponding to the fifth row and the sixth row of the RGB image data 4, the conversion switching section 1136 applies the pixel unit converting section 1135 for converting the RGB image data into the CMYK image data, whereas as to areas corresponding to rows other than the fifth and sixth rows of the RGB image data 4, the conversion switching section 1136 applies the area unit converting section 1134 for converting the RGB image data into the CMYK image data.

Next, print control operation by the print control apparatus with employment of the above-descried arrangement will now be described.

Figure 4:
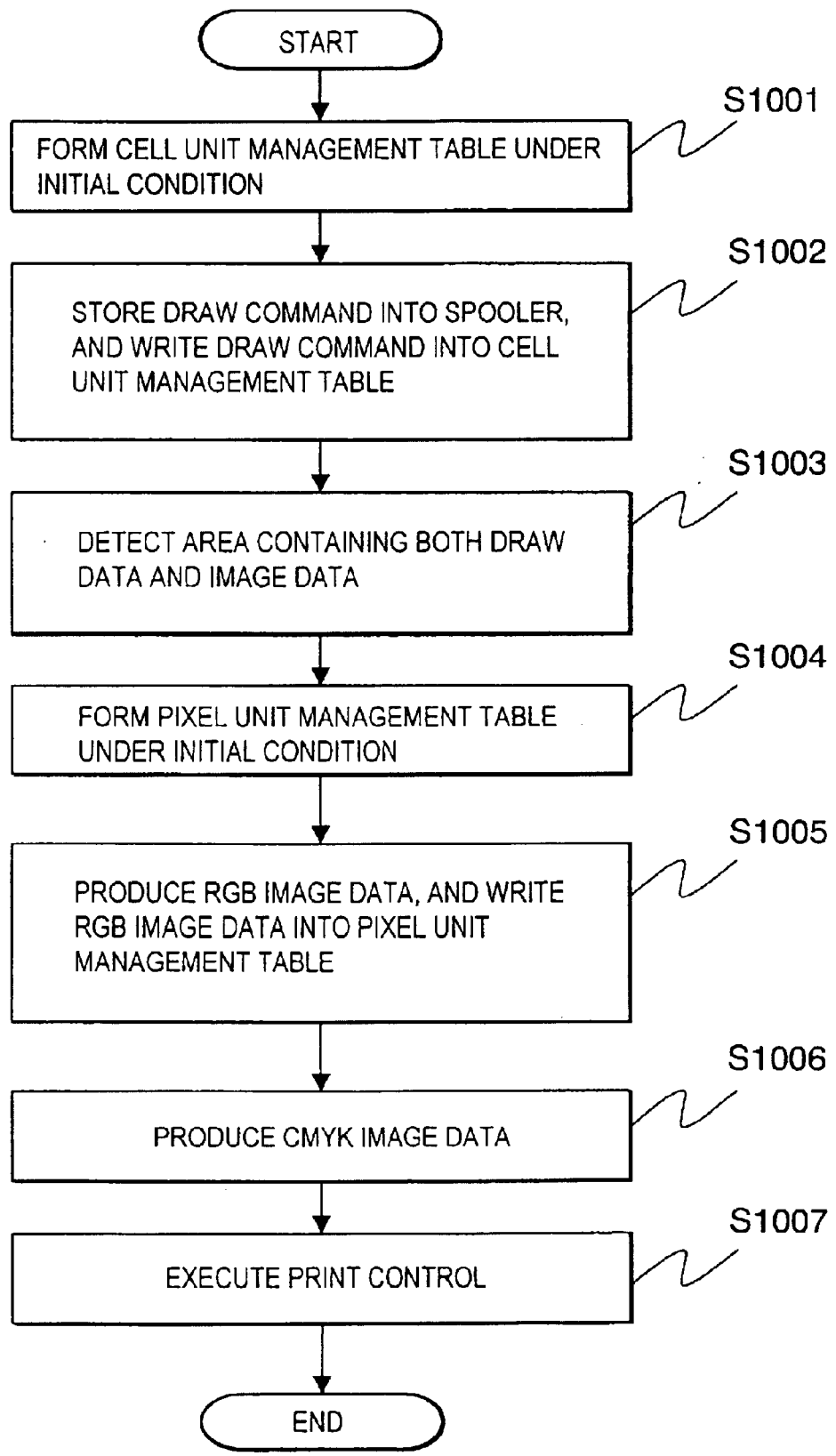
FIG. 4 is a flow chart for describing print control operation of the print control apparatus 1 indicated in FIG. 1.

FIG. 4 is a flow chart for describing the print control operation of the print control apparatus 1 to which this embodiment is applied.

At a first step S1001, the first judging section 1131 forms such a cell unit management table 122 in which the respective cells are empty (namely, cell unit management table 122 under initial condition) based upon the size information or the like of the document data produced by the application program 132.

Next, the SPOOL processing unit 111 stores the respective draw commands contained in the document data produced by the application program 132 into the SPOOL file 121 in the drawing order. In connection with this command storage operation, the first judging section 1131 checks the sort of draw object and the draw position of this draw object designated by the draw command every time the SPOOL file 121 stores thereinto the draw command. Then, the first judging section 1131 sets the flag indicative of the sort of this draw object to such a cell of the cell unit management table 122 under initial condition formed at the previous step S1001. This cell corresponds to the above-described draw position. As a result, the cell unit management table 122 is accomplished (step S1002).

Subsequently, the second judging section 1132 checks the completed cell unit management table 122 so as to detect such a row that two flags indicative of draw data and image data are set (step S1003).

Next, based upon the size information contained in the document data and the row of the cell unit management table 122 detected at the step S1003, the third judging section 1133 forms such a pixel unit management table 123 (namely, pixel unit management table 123 under initial condition) with respect to an area of RGB image data corresponding to the above-described row. At this time, the values of the respective pixel management data stored in this pixel unit management table 123 are set to such values which indicate that no draw object is drawn (step S1004).

Next, the RGB conversion processing unit 112 reads out the draw commands stored in the SPOOL file 121 in the drawing order and image-expands a draw object, so that the document data is converted into RGB image data. In this case, as to each of the pixel data positioned in the area of the RGB image corresponding to the row of the cell unit management table 122 detected at the step 51003, the third judging section 1133 checks a sort of a draw object indicated by this pixel data. Then, the third judging section 1133 registers the checked result into the pixel unit management table 123 under initial condition formed at the step 51004. As a result, a pixel unit management table 123 is completed (step S1005).

Next, the conversion switching section 1136 converts the RGB image data produced at the step S1005 into CMYK image data by utilizing both the area unit converting section 1134 and the pixel unit converting section 1135 (step S1006). Concretely speaking, the conversion switching section 1136 applies the pixel unit converting section 1135 with respect to the area of the RGB image data corresponding to the row of the cell unit management table 122, which is detected at the step 51003 for converting the RGB image data into the CMYK image data. The conversion switching section 1136 applies the area unit converting section 1134 to the areas of the RGB image data corresponding to the columns of the cell unit management table 122 other than the row detected at the step 51003 for converting the RGB image data into the CMYK image data.

Next, the print control unit 114 sends the CMYK image data produced at the step S1006 via the printer connecting apparatus 18 to the printer 2 by using such a control command which can be interpreted by the printer 2 for printing out the desirable image (step S1007).

The print control apparatus 1 according to one embodiment mode of the present invention has been described.

In accordance with this embodiment mode, since the above-described arrangement is adopted, in the RGB image data produced by the RGB conversion processing unit 112, as to such a data portion where the draw data is drawn, the RGB image data is converted into the CMYK image data by referring to the draw data color conversion table 134, whereas as to such a data portion where the image data is drawn, the RGB image data is converted into the CMYK image data by referring to the image data color conversion table 135. As a consequence, the document data containing both the draw data and the image data can be converted into the CMYK image data in a proper manner.

Also, in accordance with this embodiment, the conversion switching unit 1135 utilizes the area unit converting section 1134 and the pixel unit converting section 1135 for converting the RGB image data produced by the RGB conversion processing unit 112 into the CMYK image data. In this case, as to the respective areas obtained by subdividing the RGB image data by the plural number, when the draw object contained in this area corresponds to the draw data, the area unit converting section 1134 converts the RGB image data contained in this area into the CMYK image data with reference to the draw data color conversion table 134, whereas when the draw object contained in this area corresponds to the image data, the area unit converting section 1134 converts the RGB image data contained in this area into the CMYK image data with reference to the image data color conversion table 135. On the other hand, as to the respective pixel data which constitute the RGB image data, when the relevant pixel data indicates the draw data, the pixel unit converting section 1135 converts this pixel data into the CMYK image data with reference to the draw data color conversion table 134, whereas when the relevant pixel data indicates the image data, the pixel unit converting section 1135 converts this pixel data into the CMYK image data with reference to the image data color conversion table 135.

Since the pixel unit converting section 1135 judges the sort of draw object every pixel to determine the color conversion table to which this converting section 135 should refer, the color correction which should be applied while the RGB image data is converted into the CMYK image data can be set in the unit of such a pixel. However, since the draw object indicated by the relevant pixel data must be managed every pixel in the pixel unit converting section 1135, a heavy work load would be required. Furthermore, a memory capacity required to execute this management process operation would be increased.

As a consequence, in accordance with this embodiment mode, the cell unit management table 122 is formed. This cell unit management table 122 is used to manage the draw objects contained in each of the plural areas which are obtained by subdividing the RGB image data by the plural number. While using this cell unit management table 122, such an area where both draw data and image data are drawn is detected. Only as to the detected area, such a pixel unit management table 123 is formed so as to manage the draw object indicated by the relevant pixel data every pixel. Then, only as to the above-explained detected area, the pixel unit converting section 1135 converts the RGB image data into the CMYK image data by using the pixel unit management table 123, whereas as to other areas than this area, the area unit converting section 1134 converts the RGB image data into the CMYK image data by employing the cell unit management table 122.

As a result, in accordance with this embodiment mode, the document data containing both the draw data and the image data can be converted into the CMYK image data in the high efficiency.

As previously described, in accordance with the above-explained embodiment, the second judging section 1132 detects the area where both the draw data and the image data are drawn with respect to each of the row of the cell unit management table 122 shown in FIG. 2. However, the present invention is not limited thereto.

For instance, the second judging section 1132 may alternatively detect such an area that both the draw data and the image data are drawn every cell of the cell unit management table 122 shown in FIG. 2.

Then, with respect to an area of RGB image data corresponding to a row containing such a cell where a flag is set and this flag indicates such a fact that both draw data and image data are drawn, the pixel unit management table 122 may be formed every pixel so as to manage draw objects indicated by this pixel data, and the data conversion into the CMYK image data by the pixel unit converting section 1135 may be applied.

Alternatively, with respect to an area of RGB image data corresponding to such a cell where a flag is set and this flag indicates such a fact that both draw data and image data are drawn, the pixel unit management table 122 may be formed every pixel so as to manage draw objects indicated by this pixel data, and the data conversion into the CMYK image data by the pixel unit converting section 1135 may be applied.

In these alternative cases, in the example shown in FIG. 2, only such an area of the RGB image data, which corresponds to either a sixth row of the cell unit management table 122 or an area of a fourth column from the left and the sixth row from the top of the cell unit management table 122, is to be converted by the pixel unit converting section 1135. As a consequence, the document data containing both the draw data and the image data may be converted into the CMYK image data in a higher efficiency.

Also, in the above-described embodiment mode, as the area of the RGB image data 4 corresponding to each of the cells of the cell unit table 122, such a rectangular area is employed by subdividing the RGB image data 4 by M×N pieces. However, the present invention is not limited to this embodiment. For instance, the RGB image data 4 may be subdivided by M pieces along the horizontal direction to obtain M rows of areas, and/or may be subdivided by N pieces along the vertical direction to obtain N columns of areas. Wider area corresponding to the cell increases converting process efficiency in the area unit converting section 1134. However, when the area is widened, since there is increased probability that both the image data and the draw data are involved in this area, it is conceivable that the application frequency of the pixel unit converting section 1135 would be increased.

It should also be understood that the RGB image data is converted into the CMYK image data in the above-described print control apparatus of the embodiment, though the present invention is not limited thereto. For instance, the RGB image data may be converted into such image data obtained by adding both light magenta (LM) and light yellow (LY) to CMYK image data.

Also, in the above-explained embodiment mode, the present invention has been applied to the print control apparatus. The inventive idea of the present invention may be widely applied to an image converting apparatus by which document data containing both draw data and image data is converted into first image data, and this first image data is further converted into second image data.

Furthermore, in the above-described embodiment, while the texts and the figures are defined as the draw data and the photographs are defined as the image data, the draw objects are classified by two sorts, the color conversion tables to be used are switched in correspondence with the sort of the relevant draw object. However, the present invention is not limited to the above-described embodiment. For example, alternatively, while a draw object is classified into more than 3 sorts of draw objects such as character data, figure data, and photograph data, color conversion tables are prepared with respect to these plural sort of draw objects, and these color conversion tables may be switched for use in accordance with a sort of a draw object under use.

As previously explained, in accordance with the present invention, the document data constituted by containing the plural sorts of draw objects can be converted into the image data constructed of the plural pixel data in the proper manner and in the higher efficiency. For example, such document data constituted by containing the draw command, which designates the draw object of such image data as the draw data (e.g., text and figure) and the image data (e.g., photograph), can be converted into the image data made of the plural pixel data, in particular, the CMYK image data corresponding to the format suitable for the printing operation in the proper manner and also in the higher efficiency.

What is claimed is:

1. An image converting apparatus for converting document data having a plurality of types of drawing objects into image data, the apparatus comprising:

first conversion means for converting said document data into first image data;

second conversion means for converting said first image data into second image data; and a plurality of tables respectively corresponding to the plurality of types of drawing objects and containing information to which the image converting apparatus refers when said first image data is converted into said second image data, wherein said second conversion means comprises, area creating means for subdividing the first image data into a plurality of areas;

area unit conversion means for converting first image data within one or more of the plurality of areas into corresponding second image data, while referring to one or more of said tables that respectively correspond to a type of drawing object contained in said one or more of the areas;

pixel unit conversion means for converting individual pixel data corresponding to one or more pixels within one or more of the plurality of areas into corresponding second image data, while referring to one or more of said tables that respectively correspond to a type of drawing object indicated by the individual pixel data; and conversion switching means for applying said pixel unit conversion means to areas wherein at least two of said plurality of tables correspond to respective types of drawing objects contained therein, and for applying said area unit conversion means to areas wherein one of said tables corresponds to a type of drawing object contained therein or to areas containing no drawing object.

2. An image converting apparatus for converting document data into image data constituted by a plurality of pixel data, said document data being constituted by containing a draw object classified as draw data and also a draw object classified as image data, comprising:

first conversion means for converting said document data into first image data;

second conversion means for converting said first image data into second image data;

a first table containing information to be referred to when first image data obtained by converting the draw data is converted into second image data; and a second table containing information to be referred to when first image data obtained by converting the image data into second image data; wherein:

said second conversion means includes:

area unit conversion means operated in such a manner that as to each of areas obtained by subdividing said first image data by plural number, when a draw object contained in said area is classified as the draw data, first image data of said area is converted into second image data with reference to said first table, whereas when said draw object is classified as image data, first image data contained in said area is converted into second image data with reference to said second table;

pixel unit conversion means operated in such a manner that as to each of pixel data for constituting said first image data, when a draw object indicated by said pixel data is classified as draw data, said pixel data is converted into second image data with reference to said first table, whereas when said draw object is classified as image data, said pixel data is converted into second image data with reference to said second table; and conversion switching means for applying said pixel unit conversion means to such an area containing both the draw object classified as the draw data and the draw object classified as the image data, and for applying said area unit conversion means to such an area containing any one of said draw objects classified as the draw data and the image data within said first image data.

3. An image converting apparatus as claimed in claim 2 wherein:

as to each of the areas obtained by subdividing said first image data by the plural number, in such a case that a draw object is not contained in said area, said area unit conversion means converts first image data of said area into second predetermined image data without reference to said first table and said second table; and as to each of the pixel data constituting said first image data, in such a case that said pixel data does not indicate a draw object, said pixel unit conversion means converts said pixel data into second predetermined image data without referring to said first table and said second table.

4. An image converting apparatus as claimed in claim 2, further comprising:

first judging means operated, prior to the conversion of document data into first image data by said first conversion means, in such a manner that when said document data is converted into said first image data, as to each of first areas obtained by subdividing said first image data by plural number, said first judging means judges a draw object contained in said first areas;

second judging means for judging as to whether or not both a draw object classified as draw data and a draw object classified as image data are contained in each of plural second areas which are arranged by containing at least one of said first areas based upon the judgment result of said first judging means; and third judging means operated in such a manner that while said document data is converted into the first image data by said first converting means as to each of the pixel data contained in said second area which is judged by said second judging means in such a way that both the draw object classified as the draw data and the draw object classified as the image data are contained therein, said third judging means judges the draw object indicated by the pixel data; wherein:

said conversion switching means applies said area unit conversion means to such a second area which is not judged by said second judging means in such a way that both the draw object classified as the draw data and the draw object classified as the image data are contained therein, and further, applies said pixel unit conversion means to such a second area which is judged by said second judging means in such a way that both said draw objects classified as the draw data and the image data are contained;

said area unit conversion means determines said first table and said second table, which should be referred to in the case that as to the second area application-instructed by said conversion switching means, first image data contained in this second area is converted based upon the judgment result of said first judging means; and said pixel unit conversion means determines said first table and said second table; which should be referred to in the case that as to each of the pixel data contained in the second area application-instructed by said conversion switching means, said pixel data is converted based upon the judgment result of said third judging means.

5. An image converting apparatus as claimed in claim 4, wherein:

said first areas are cells;

said second area is constituted by a plural number of said cells located adjacent to each other;

while using a cell unit management table which is constituted by a plurality of entries corresponding to the respective cells, said first judging means describes into each of entries of said cell unit management table, the judgment results of the draw objects contained in said cells corresponding to said entries; and said second judging means judges as to whether or not both the draw object classified as the draw data and the draw object classified as the image data are contained in said second area by checking the judgment results of the draw objects described in the respective entries corresponding to said plurality of cells contained in said second area.

6. An image converting apparatus as claimed in claim 4, wherein:

while said third judging means uses a pixel unit management table constituted by a plurality of entries corresponding to respective pixel data contained in said second area which is judged by said second judging unit in such a way that both the draw object classified as the draw data and the draw object classified as the image data are contained, said third judging means describes the judgment results of the draw objects indicated by the pixel data corresponding to said entries into said respective entries of said pixel unit management table.

7. An image converting apparatus as claimed in claim 2, wherein:

said first image data is RGB image data;

said second image data is CMYK image data; and said first and second tables correspond to such tables on which color correction information is described, when the RGB image data is converted into the CMYK image data, said color correction information being referred to.

8. An image converting apparatus as claimed in claim 2, further comprising:

area unit judging means operated, prior to the conversion of document data into first image data by said first conversion means, in such a manner that when said document data is convened into said first image data, as to each of a plurality of cells obtained by subdividing said first image data by a plural number, said area unit judging means judges a draw object contained in one of said cells, and also describes the judgment result in an entry corresponding to the one cell, provided in a cell unit management table which is constituted by a plurality of entries corresponding to respective cells; and pixel unit judging means operated in such a manner that while said document data is converted into the first image data by said first converting means, as to each of the pixel data contained in the cells corresponding to such entries contained in said cell unit management table to which such a fact is described that both a draw object classified as draw data and a draw object classified as image data are contained, said pixel unit judging means judges a draw object indicated by said pixel data, and also describes the judgment result in an entry corresponding to said pixel data, provided in a pixel unit management table which is constituted by a plurality of entries corresponding to said respective pixel data; wherein:

said conversion switching means applies said pixel unit conversion means to a cell corresponding to the entry contained in said cell unit management table- to which such a fact is described that both the draw object classified as the draw data and the draw object classified as the image data are contained, and also applies said area unit conversion means to cells other than said cell;

said area unit conversion means determines said first table and said second table which should be referred to in such a case that as to a cell application-instructed by said conversion switching means, such a fact is described that any one of said draw object classified as the draw data and said draw object classified as the image data is contained in the entry corresponding to said cell of said cell unit management table, depending upon the sort of said draw object; said area unit conversion means converts first image data contained in said cell into second image data by employing the determined table; whereas in the case that such a fact that the draw object is contained is not described in the entry corresponding to said cell, provided in said cell unit management table, said area unit conversion means converts the first image data contained in said cell into predetermined second image data without referring to said first table and said second table; and said pixel unit conversion means determines said first table and said second table, which should be referred to in such a case that as to each of pixel data contained in the cell application-instructed by said conversion switching means, such a fact is described that any one of said draw object classified as the draw data and said draw object classified as the image data is contained in an entry corresponding to said cell of said cell unit management table, depending upon the sort of said draw object; said pixel unit conversion means converts said pixel data into second image data by employing the determined table; whereas in the case that such a fact that the draw object is contained is not described in an entry corresponding to said pixel data, provided in said pixel unit management table, said pixel unit conversion means converts the pixel data into predetermined second image data without referring to said first table and said second table.

9. A print control apparatus for controlling a printer, comprising:

the image converting apparatus recited in claim 2 wherein:

said print control apparatus controls printing operation of said printer in response to said image data produced by said image converting apparatus.

10. A storage medium for storing thereinto a program used to convert document data constituted by containing plural sorts of draw objects into image data constituted by a plurality of pixel data, wherein:

while said program is read to be executed by a computer, both first converting means for converting said document data into first image data, and second converting means for converting said first image data into second image data are constituted on said computer; and said second converting means includes:

area unit converting means, as to each of areas obtained by subdividing said first image data by plural number, for converting first image data of said area into second image data with reference to a table containing information which should be referred to in the case that the first image data is converted into the second image data, and said first image data is previously prepared in correspondence with a sort of draw object contained in said area and also is obtained by converting said sort of draw object;

pixel unit converting means, as to each of pixel data constituting said first image data, for converting said pixel data into second image data with reference to a table containing information which should be referred to in the case that the first image data is converted into the second image data, and said first image data is previously prepared in correspondence with a sort of draw object indicated by said pixel data and also is obtained by converting said sort of draw object; and conversion switching means for applying said pixel unit conversion means to such an area wherein at least two said tables are corresponded to sorts of draw objects contained therein, and for applying said area unit conversion means to such an area wherein one said table is corresponded to a sort of a draw object contained therein or to such an area containing no draw object, within said first image data.

11. A program product for converting document data constituted by containing plural sorts of draw objects into image data constituted by a plurality of pixel data, wherein:

while said program is read to be executed by a computer, both first converting means for converting said document data into first image data, and second converting means for converting said first image data into second image data are constituted on said computer; and said second converting means includes:

area unit converting means, as to each of areas obtained by subdividing said first image data by plural number, for converting first image data of said area into second image data with reference to a table containing information which should be referred to in the case that the first image data is converted into the second image data, and said first image data is previously prepared in correspondence with a sort of draw object contained in said area and also is obtained by converting said sort of draw object;

pixel unit converting means, as to each of pixel data constituting said first image data, for converting said pixel data into second image data with reference to a table containing information which should be referred to in the case that the first image data is converted into the second image data, and said first image data is previously prepared in correspondence with a sort of draw object indicated by said pixel data and also is obtained by converting said sort of draw object; and conversion switching means for applying said pixel unit conversion means to such an area wherein at least two said tables are corresponded to sorts of draw objects contained therein, and for applying said area unit conversion means to such an area wherein one said table is corresponded to a sort of a draw object contained therein or to such an area containing no draw object, within said first image data.

12. An image converting method for converting document data constituted by containing plural sorts of draw objects into image data constituted by a plurality of pixel data, comprising:

a first converting step for converting said document data into first image data; and a second converting step for converting said first image data into second image data;

wherein:

said second converting step includes:

an area unit converting step, as to each of areas obtained by subdividing said first image data by plural number, for converting first image data of said area into second image data with reference to a table containing information which should be referred to in the case that the first image data is converted into the second image data, and said first image data is previously prepared in correspondence with a sort of draw object contained in said area and also is obtained by converting said sort of draw object; and a pixel unit converting step, as to each of pixel data constituting said first image data, for converting said pixel data into second image data with reference to a table containing information which should be referred to in the case that the first image data is converted into the second image data, and said first image data is previously prepared in correspondence with a sort of draw object indicated by said pixel data and also is obtained by converting said sort of draw object; and wherein said pixel unit converting step is applied to such an area wherein at least two said tables are corresponded to sorts of draw objects contained therein, and said area unit converting means is applied to such an area wherein one said table is corresponded to a sort of a draw object contained therein or to such an area containing no draw object, within said first image data.

13. An image converting apparatus for converting document data into image data constituted by a plurality of pixel data, said document data comprising a draw object classified as draw data and also a draw object classified as image data, the apparatus comprising:

first conversion means for converting said document data into first image data;

second conversion means for converting said first image data into second image data;

a first table containing information to be referred to when first image data obtained by converting the draw data is converted into second image data; and a second table containing information to be referred to when first image data obtained by converting the image data is converted into second image data, wherein said second conversion means comprises;

area unit conversion means operated in such a manner that as to each of areas obtained by subdividing said first image data by plural number, when a draw object contained in said area is classified as the draw data, first image data of said area is converted into second image data with reference to said first table, whereas when said draw object is classified as image data, first image data contained in said area is converted into second image data with reference to said second table;

pixel unit conversion means operated in such a manner that as to each of pixel data for constituting said first image data, when a draw object indicated by said pixel data is classified as draw data, said pixel data is converted into second image data with reference to said first table, whereas when said draw object is classified as image data, said pixel data is converted into second image data with reference to said second table;

conversion switching means for applying said pixel unit conversion means to such an area containing both the draw object classified as the draw data and the draw object classified as the image data, and for applying said area unit conversion means to such an area containing any one of said draw objects classified as the draw data and the image data within said first image data;

area unit judging means operated, prior to the conversion of document data into first image data by said first conversion means, in such a manner that when said document data is converted into said first image data, as to each of a plurality of cells obtained by subdividing said first image data by a plural number, said area unit judging means judges a draw object contained in one of said cells, and also describes the judgment result in an entry corresponding to the one cell, provided in a cell unit management table which is constituted by a plurality of entries corresponding to respective cells; and pixel unit judging means operated in such a manner that while said document data is converted into the first image data by said first converting means, as to each of the pixel data contained in the cells corresponding to such entries contained in said cell unit management table to which such a fact is described that both a draw object classified as draw data and a draw object classified as image data are contained, said pixel unit judging means judges a draw object indicated by said pixel data, and also describes the judgment result in an entry corresponding to said pixel data, provided in a pixel unit management table which is constituted by a plurality of entries corresponding to said respective pixel data.

* * * * *